(12) United States Patent
Asplund et al.

(10) Patent No.: US 7,321,500 B2
(45) Date of Patent: Jan. 22, 2008

(54) ELECTRIC POWER CONVERTER

(75) Inventors: Gunnar Asplund, Ludvika (SE); Ying Jiang Häfner, Ludvika (SE); Johan Lindberg, Göteborg (SE); Peter Lundberg, Västerås (SE); Jan Svensson, Västerås (SE); Rolf Pålsson, Saxdalen (SE)

(73) Assignee: ABB Technology Ltd., Zürich (CH)

( * ) Notice: Subject to any disclaimer, the term of this patent is extended or adjusted under 35 U.S.C. 154(b) by 0 days.

(21) Appl. No.: 11/413,004

(22) Filed: Apr. 28, 2006

(65) Prior Publication Data

US 2006/0256587 A1    Nov. 16, 2006

Related U.S. Application Data

(60) Provisional application No. 60/675,845, filed on Apr. 29, 2005.

(51) Int. Cl.
*H02J 3/36* (2006.01)
*H02M 5/45* (2006.01)

(52) U.S. Cl. .......................... 363/35; 363/37
(58) Field of Classification Search ........... 363/34–37
See application file for complete search history.

(56) References Cited

U.S. PATENT DOCUMENTS

| 4,309,749 | A | * | 1/1982 | Weibelzahl et al. ........... 363/87 |
| 5,657,216 | A | * | 8/1997 | Kaura ......................... 363/41 |
| 6,400,585 | B2 | | 6/2002 | Jiang-Hafner | |
| 6,643,154 | B1 | * | 11/2003 | Hagman ...................... 363/96 |
| 7,206,211 | B2 | * | 4/2007 | Blidberg et al. ............ 363/132 |

* cited by examiner

*Primary Examiner*—Gary L Laxton
(74) *Attorney, Agent, or Firm*—Venable LLP; Eric J. Franklin

(57) ABSTRACT

A voltage source converter for high power application containing a plurality of valves, each valve containing a plurality of extinguishable semiconducting elements, and a valve control unit containing a computer and a pulse-width modulator providing an executing control signal for controlling the semiconducting elements. The valve control unit includes a first control containing a first pulse-width modulator for providing a first pulse-width modulation signal, a second control containing a second pulse-width modulator for providing, a second pulse-width modulation signal, a mode detector, and a selector connected to the first and second pulse-width modulator for selecting in dependence of the mode detector the executing pulse-width modulation signal.

20 Claims, 8 Drawing Sheets

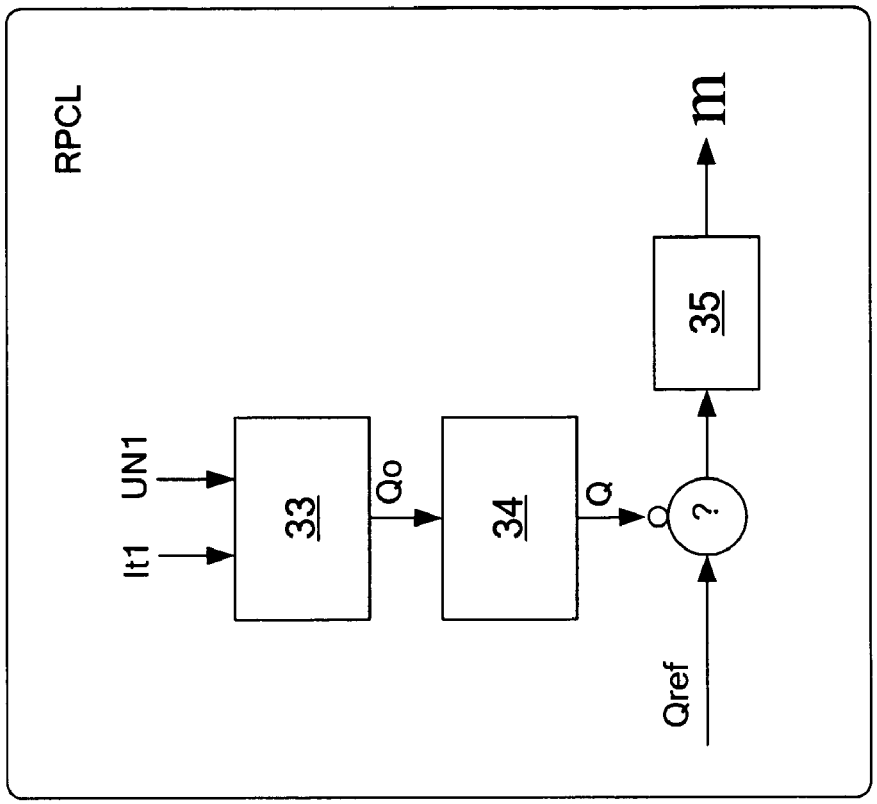
FIG. 4C-B
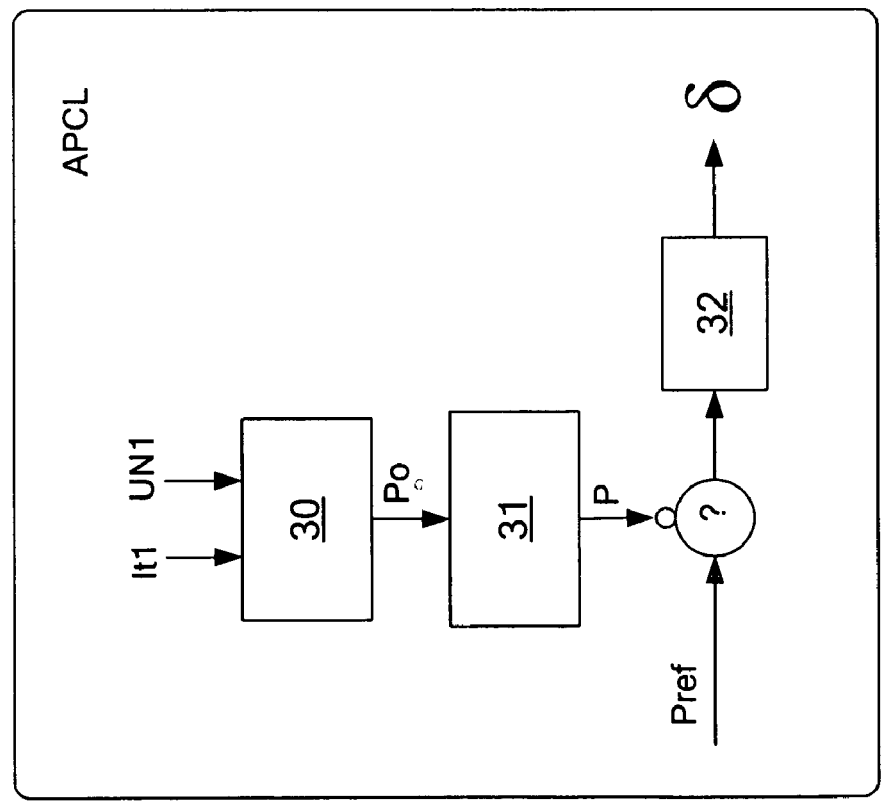
FIG. 4C-A

ELECTRIC POWER CONVERTER

CROSS-REFERENCE TO RELATED APPLICATIONS

This application claims priority to U.S. provisional patent application 60/675,845 filed 29 Apr. 2005.

TECHNICAL FIELD

The present invention concerns conversion of an alternating current into a direct current or inversely for high power application. Especially the invention concerns a voltage source converter for high voltage direct current transmission and for static var compensation. The voltage source converter comprises a plurality of valves, each containing a plurality of semiconducting elements. The invention also concerns a method for controlling the high power voltage source converter.

By the expression semiconducting element or semiconductor should be understood any kind of semiconducting element for high power and high voltage applications. Especially such semiconductor comprises an extinguishable or a turn-off kind semiconductor. Examples of power semiconductors of the turn-off kind are a gate turnoff (GTO) thyristor, and an Insulated Gate Bipolar Transistor (IGBT).

BACKGROUND OF THE INVENTION

A circuit comprising a plurality of units with semiconducting elements constitutes an integral part of an electric power converter, where they are used as electronic power switches. These switches are arranged in series connection, where each switch is capable of maintaining a part of the voltage applied over the converter. Known power semiconductors are capable of holding a voltage of 1 to 6 kV. By series connection of a plurality of such switches a converter may maintain a voltage within a range of 10 to 500 kV. Each switch comprises a plurality of semiconducting elements that may be connected in series and/or in parallel to achieve a performance of desire. The series connection will increase the voltage capability and the parallel connection will increase the current capacity.

In a voltage source converter (VSC) the electronic power switches comprises semiconductors of the turn-off type. Such converters are used in high voltage direct current (HVDC) applications for converting direct current to alternating current or inversely. Such converters are also used in static var compensators (SVC) and reactive power compensation (RPC) plants for balancing the power transmission within a power network.

Semiconductors like GTO thyristors and IGBT are suitable for high power applications. Semiconductors of the latter kind is often preferable since they combine good power handling ability with properties which make them well suited for connection in series. They may be turned off with high accuracy. In such constellations a plurality of IGBTs form valves in a voltage source converter for handling voltages up to 500 kV.

Among the existing HVDC transmission system containing voltage source converters there is known at least two configurations. One such configuration comprises a two level converter bridge for use preferably up to 65 MW. The two level bridge is the most simple circuit configuration to build up a three phase forced commutated VSC bridge. The bridge consists of six valves each containing a valve unit comprising switching means. Each valve unit is built up of a plurality of series connected turn-off devices and anti parallel diodes.

A second configuration comprises a three level converter bridge for use preferably up to 330 MW. The three level converter bridge comprises in all 18 valve functions. The three level bridge also comprises extra valve units in comparison with the two level bridge.

Although the two level converter has a simple construction it also has a drawback of high operation losses. The three level converter offers a better way of control but has drawbacks of higher semiconductor cost, bulky AC and DC filters and a possible occurrence of a DC unbalance. For a the three level converter in comparison with a the two level converter, there is a cost transfer from operation (high switching losses) to investment (increased number of valves).

A Pulse Width Modulation (PWM) signal is used to control the voltage source converter. When the HVDC system transmits an active effect the voltage and the current is almost in phase. Under such condition an Optimized Pulse Width Modulation (OPWM) method is advantageous. The pulse train of the OPWM is designed to control the fundamental bridge voltage and at the same time optimizing the criteria for controlling the harmonics. The OPWM signal is calculated in advance and supplied to the valve controller. The OPWM signal is constructed such that fewer switching operations occur when the current is high. Since the heat generation of the semiconductors depend on both the voltage level and current level at switching there will be less heat generation in the semiconductors when using the OPWM method.

Semiconductors are sensitive to heat. The valve operates well below the max allowed junction temperature. However, when this temperature is exceeded the semiconductor will malfunction. Therefore most voltage source converters comprise a cooling system for transporting away the heat. Thus, by a cooling system the performance of the semiconductor may be increased. Another way of increasing the performance of the semiconductor is the reduction of heat generated by switching losses. As discussed above one way of accomplish this is to reduce the number of switching events and another way is to arrange the switching events where the current is low. This is obtained by OPWM via fewer switching, i.e., lower switching frequency, and avoiding switching at high current.

The drawback of OPWM is its poor transient control capability. Due to the modulation method it is not an on-line modulation and some switching instants may not occur continuously and regularly. The poor transient control capability, which leads to transient over DC voltage and over AC current, not only increases cost due to over-dimension the apparatus, but also worsen the performance of the transmission system.

To be able to handle the transients caused by AC faults or other disturbances, an on-line modulation method, i.e., carrier based PWM method, is used. The disadvantage of carrier based PWM is that it requires a higher switching frequency. It switches continuously independent of low or high current. As a result it gives high losses. Hence the carrier based PWM method offers a faster dynamic control during a transient behavior. However, since the switching of the semiconductor also occurs when the current is high the carrier based PWM method is more heat generating than the OPWM method.

A high voltage direct current transmission system as shown by the schematic single line and block diagram in FIG. 1 is previously known. A first and a second converter station STN1 and STN2 respectively are connected to each other via a direct current link having two pole conductors W1 and W2 respectively. Typically, the pole conductors comprise cables but may also, at least in part, comprise overhead lines. Each converter station contains a capacitor equipment, C1 and C2 respectively, connected between the pole conductors, and a voltage source converter, CON1 and CON2 respectively. Each converter comprises semiconductor valves in a bridge connection known per se, such as, for example, a 2-level or a 3-level converter bridge. The semiconductor valves comprise branches of gate turn on/turn off semiconductor elements, for example power transistors of so-called IGBT-type, and diodes in anti-parallel connection with these elements.

Each converter is via a phase reactor 2 and transformer 1 connected to a three-phase alternating current electric power network N1 and N2, respectively. Although not shown in the figure, the converters may be connected to the three-phase network directly without transformers. Under certain circumstances the phase reactor is replaced by a transformer. Filter equipment 3 are connected in shunt connection at connection points between the phase inductors and the three-phase networks.

The first converter station STN1 comprises control equipment CTRL1 for generation switching control pulse FP1, which comprises turn on/turn off orders to the semiconductor valves according to a predetermined pulse width modulation pattern. The inputs to the converter control, in addition to reference orders such as DC voltage or active power and AC voltage or reactive power, comprises measured DC voltage Ud1, 3-phase AC current I1 and 3-phase AC voltage UL1. The inputs to the converter may also include measured 3-phase current in transformer It1 and 3-phase voltage at primary side of transformer UN1. The DC-voltage across the capacitor equipment C1 is designated Ud1 and is sensed with only symbolically shown sensing device M11. Similarly, signals I1, UL1, It1 and UN1 are sensed with sensing devices M12, M13, M14 and M15 respectively.

The second converter station STN2 comprises control equipment CTRL2, which is similar to the control equipment CTRL1, for generation switching control pulse FP2. The inputs to the converter control of STN2 are similar to those to the converter control of STN1.

The converter stations may operate in four different modes, one of dc-voltage control and active power control and one of ac-voltage control and reactive power control. Usually, one of the converter stations, for example the first one, operates under DC-voltage control for voltage control of the direct current link, whereas the second converter station operates under active power control and under AC-voltage or reactive power control. The operation modes are set either manually by an operator, or, under certain conditions, automatically by a not shown sequential control system.

From U.S. Pat. No. 6,400,585 a control system for a voltage source converter in an HVDC transmission system is previously known.

A previously known control equipment is shown in FIG. 2. The two control equipments CTRL1 and CTRL2 normally present in a HVDC transmission system are represented by common control equipment CTRL in FIG. 2A. Thus, the indices 1 and 2 are omitted for sake of simplicity.

An outer active/reactive power control loop 4 generates the reference values of converter current in dq-components which are the inputs to an inner current control loop 5. Although not shown in the figure, there are four sub-control loops. As an example, FIG. 2B shows the structure of an active power control loop ACPL. The DC voltage, reactive power and AC voltage control loop can be built up in a similar way. The active power control loop is used to control either the active power to/from the converter or the DC voltage. In the embodiment shown the active power control loop comprises an active power calculation unit 8, a signal processing or filtering unit 9, a comparator and a regulator 10. For instance, if the active power should be controlled, the control loop has reference Pref and measured active power P as inputs and results in output d-component current reference ($i_{v\_ref}^{d}$) via a regulator 10 with for example a proportional/integrating characteristics. The selection of active power control or DC voltage is determined by input signal UDC_CTRLmod. The reactive power control loop, which results in q-component current reference ($i_{v\_ref}^{q}$), can be used to control either the reactive power to/from the converter or the AC voltage amplitude. The selection of reactive power control or AC voltage is determined by input signal UAC_CTRLmod.

The inner current control loop 5 tracks the reference values of converter current and generates the voltage reference for the converter. In order to have control on direct current quantities instead of three phase alternative current quantities, the converter current control system operates in a conventional way with three phase units (voltages and currents of the alternating current network) transformed into and expressed in a rotating two-phase dq-reference plane, arrived at via a transformation 6 to a stationary two-phase αβ-reference plane, and the transformation is realized with techniques known per se via signal ξ, which is the output of Phase-Locked Loop PLL. The signal ξ represents an electrical angle linearly increasing with time with a time rate proportional to the actual frequency of the alternating current network, and it is locked to and in phase with the phase position of the bus voltage of the alternating current network.

The inner current control loop 5, as shown in FIG. 2A, is supplied with the current reference $\bar{I}_{v\text{-}ref}^{dq}$, which is the measured current I1 in FIG. 1 in dq-components $\bar{I}_{v}^{dq}$, and the bus voltage UL transformed to the dq-reference plane $\bar{U}_{L}^{dq}$. The inner current controller 5 outputs in dependence thereon an output signal designated $\bar{U}_{v\text{-}ref}^{dq}$, which is the voltage reference vector for the bridge voltage of the converter in the dq-reference plane.

The current reference values $I_{v\text{-}ref}^{d}$ and $I_{v\text{-}ref}^{q}$ may be limited in accordance with specified operating conditions for the transmission system before further processing. Such limitation means, which may be implemented in known ways per se, are not treated in this context.

The reference transformation 6 in FIG. 2A transfers the converter reference voltage $\bar{U}_{v\text{-}ref}^{dq}$ in a rotating dq-reference plane to the stationary plane having $\bar{U}_{v\text{-}ref}^{abc}$ as components voltages reference values for the respective three phases of the alternating current system.

The voltage reference vector $\bar{U}_{v\text{-}ref}^{abc}$ is supplied to the pulse width modulation unit 7 that generates in dependence thereon a train FPa, FPb, and FPc of turn on/turn off orders according to a predetermined PWM pattern supplied to the semiconductor valves. In according to prior art, the predetermined PWM is a carrier based PWM such as sinusoidal PWM (SPWM), or sinusoidal PWM including 3rd harmonic modulation (3PWM).

It is known in a feedback system that a conflict between the response speed and stability makes the design of a control system difficult. What should be noticed is that the design of control for a voltage source converter in power system applications such as HVDC or static var compensator is even more difficult, due to that there is not only harmonic stability but also high requirement on harmonic performance, in addition to low frequency stability. In the prior art control system as shown in FIG. 2, often the control speed has to compromise with the rigid steady-state harmonic performance. As a result of lower response speed, the cost for the components or apparatus in the main circuit may be increased, for instance, the valves may have to be dimensioned with larger voltage and current margin in to achieve good performance during a transient caused by short-circuit faults in the connected AC network.

Thus, there is a need for a HVDC system comprising VSC that offers a high effect for lesser investment cost.

SUMMARY OF THE INVENTION

A primary object of the present invention is to seek ways to improve the voltage source converter by maintaining effect and transient capability with a lesser number of semiconductors. A secondary object is to provide a HVDC transmission system comprising a plurality of voltage source converters that is capable of efficiently transmitting an active effect containing transients.

This object is achieved with a control apparatus or by a method according to the present invention.

According to the invention the control system of a voltage source converter comprises a combination of a first pulse-width modulator with a first switching pattern and a second pulse-width modulator with a second switching pattern. Hence during a first mode of operation, which may be a steady-state operation, the converter is controlled by the second pulse-width modulator and during a second mode of operation, which may be a transient operation, the converter is controlled by the first pulse-width modulator. An intelligent detection function which enables the modulation and the corresponding control system will smoothly switch from the first pulse-width modulator to the second pulse-width modulator and vice-versa when a disturbance causing a transient occurs. In an embodiment of the invention the first pulse-width modulator comprises a fast dynamic control and the second pulse-width modulator comprises a slow dynamic control.

The first pulse-width modulator comprises preferably a carrier based PWM method such as 3PWM. The second pulse-width modulator comprises in a first embodiment a carrier based PWM method with the second switching pattern being different from the first switching pattern. In a second embodiment the second pulse-width modulator comprises an Optimal PWM method such as OPWM. In an embodiment of the invention the first end second pulse-width modulator operates simultaneously and by a selector the signal from either modulator is chosen for an executing control signal. By this arrangement the second pulse-width modulator, which generates lesser heat, is used during most of the time. When a transient occur the method of controlling is switched from the second PWM to the first PWM. Only when disturbances or transients occur the second pulse-width modulator is in operation. The transient normally has a duration of less than one second and the additional heat generated during this period of carrier based control will rapidly transferred and absorbed by the cooling system. Hence, the short heat injection will not harm the semiconductor.

The main advantage of the OPWM is that it can selectively eliminate harmonics, thus it is possible to reduce the switching frequency, thereby the switching losses. The disadvantage of the OPWM is that it has almost no dynamic control capability.

The main advantage of carrier based PWM method is that it has a good dynamic control capability, but it requires a relative high switching frequency in order to achieve the specified harmonic performance if the converter is kept a simple structure. The disadvantage of the carrier based PWM is the heat generation caused by the higher switching rate. However, this disadvantage becomes insignificant if the carrier based PWM only be used for a very short period of time during a transient caused by AC fault. Such time period may be shorter that one s and preferably shorter than 500 ms.

According to the invention it is possible to utilize the advantage in both OPWM and carrier based PWM, and avoided the disadvantage in both PWM methods.

In a first aspect of the invention the object is achieved by a voltage source converter for high power application containing a plurality of valves, each valve comprising a plurality of valve units containing a plurality of extinguishable semiconducting elements, and a valve control unit containing computer means and a pulse width modulator providing a executing control signal to the semiconducting elements, wherein the valve control unit comprises a first control containing a first pulse-width modulator for providing a first pulse-width modulation signal, a second control containing a second pulse-width modulator for providing, a second pulse-width modulation signal, a mode detector, and a selector connected to the first and second pulse-width modulator for selecting in dependence of the mode detector the executing pulse-width modulation signal.

In an embodiment the first pulse-width modulation signal comprises a carrier based pulse-with modulation signal, such as a 3PWM signal. In a further embodiment of the invention the second pulse-with modulation comprises a carrier based pulse-with modulation signal with a different speed than the first pulse-width modulation, such as a 3PWM signal. In yet a further embodiment the second pulse-with modulation comprises an optimum pulse-with modulation signal such as an OPWM signal.

In a second aspect of the invention the object is achieved by a method for controlling a voltage source converter comprising a plurality of valves, each containing a plurality of extinguishable semiconducting elements in a high power application, wherein an executing pulse width modulation signal is provided for controlling the voltage source converter, the method comprising: controlling the voltage source converter during a first period of time wherein the executing signal comprises a first pulse-width modulation signal, and controlling the voltage source converter during a second period of time, following the first period of time, wherein the executing signal comprises a second pulse-width modulation signal.

In a further aspect of the invention the object is achieved by a computer program storable on a computer usable medium containing instructions for a processor to evaluate the method of providing a pulse width modulation signal for controlling a voltage source converter, controlling the voltage source converter during a first period of time, during which the operation is in steady state condition, by a pre-calculated pulse width modulation, and controlling the voltage source converter during a second period of time, during which the operation condition contains a transient, by a real time switching pulse width modulation.

BRIEF DESCRIPTION OF THE DRAWINGS

Other features and advantages of the present invention will become more apparent to a person skilled in the art from the following detailed description in conjunction with the appended drawings in which:

FIG. 4C-A illustrates, as an example, the structure of active power control in steady-state control, FIG. 4C-B illustrates, as an example, the structure of reactive power control in steady-state control.

DESCRIPTION OF PREFERRED EMBODIMENTS

Figure 1:
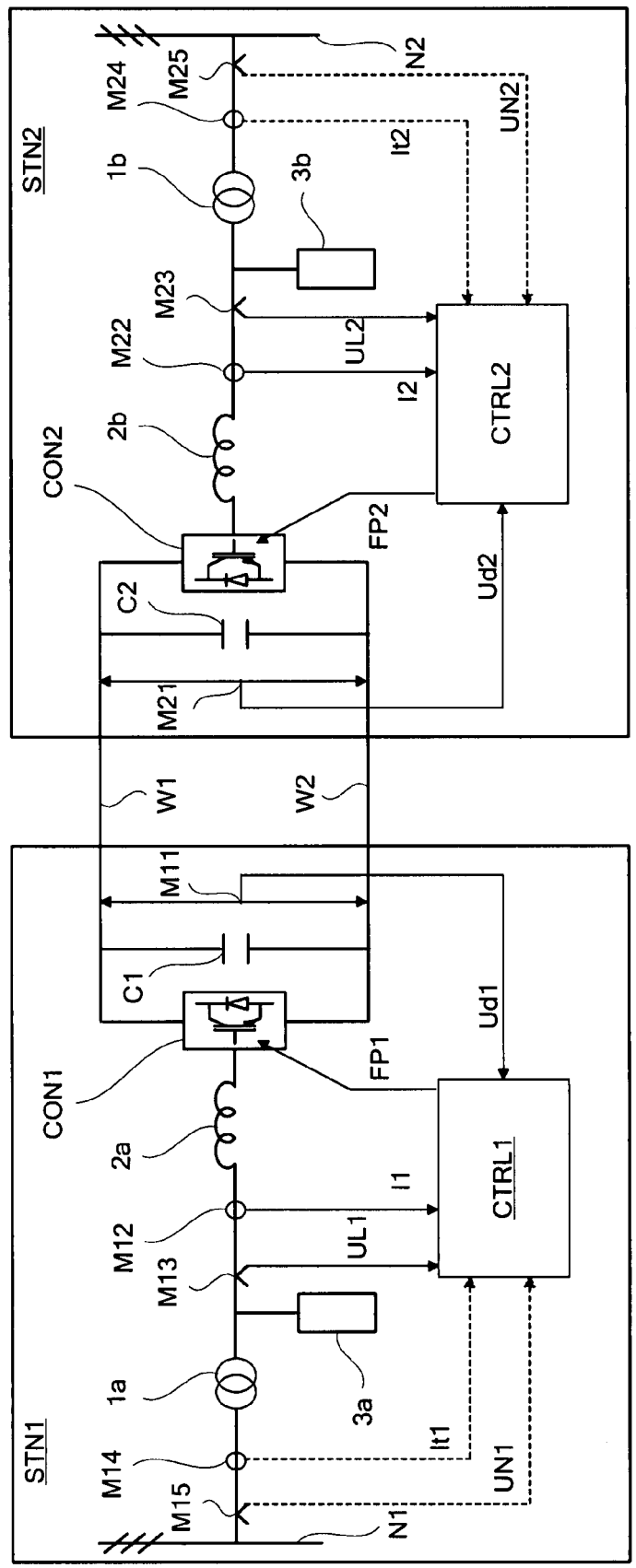
FIG. 1 shows in the form of a schematic single line and block diagram a high voltage direct current transmission system as known in the prior art.
Figure 2B:
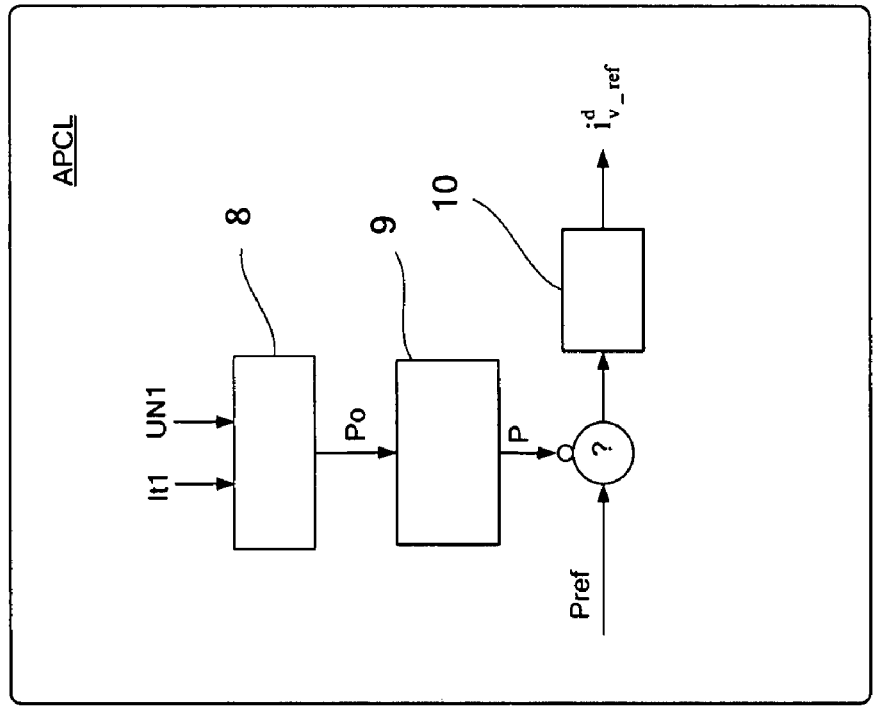
FIG. 2B illustrates, as an example, the structure of one of the four sub-control loops in outer loop control.
Figure 2A:
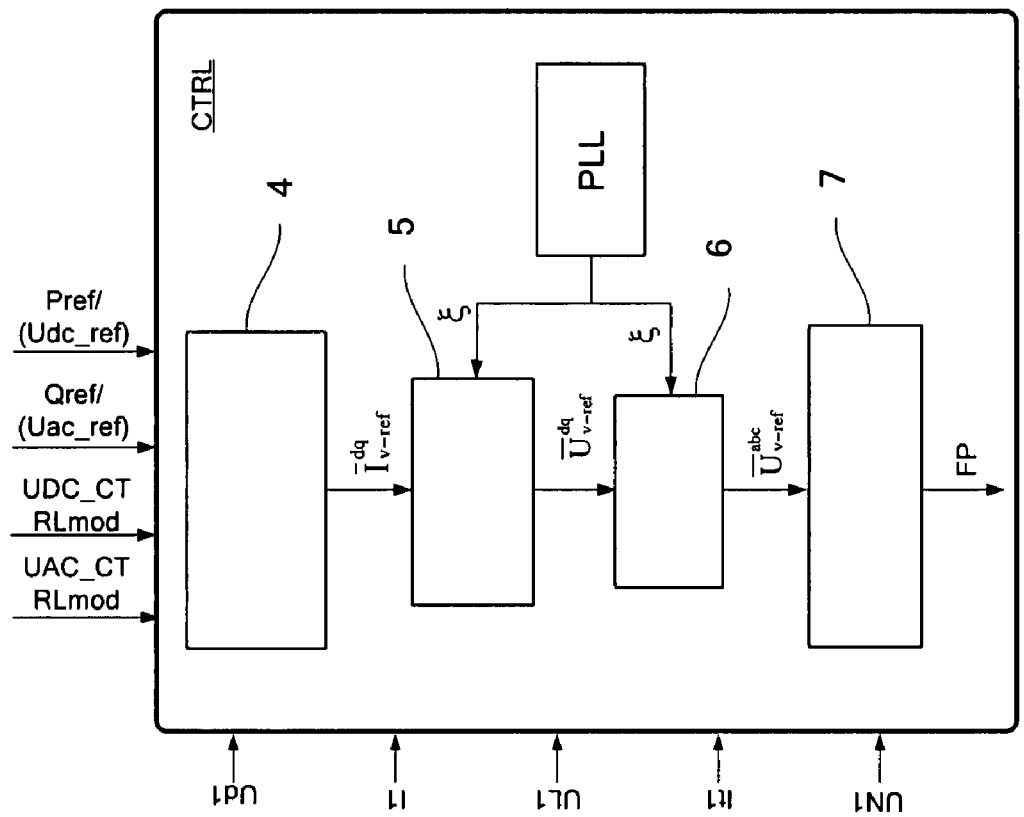
FIG. 2A shows control equipment for a voltage source converter for a transmission system according to FIG. 1 as known in the prior art.
Figure 3:
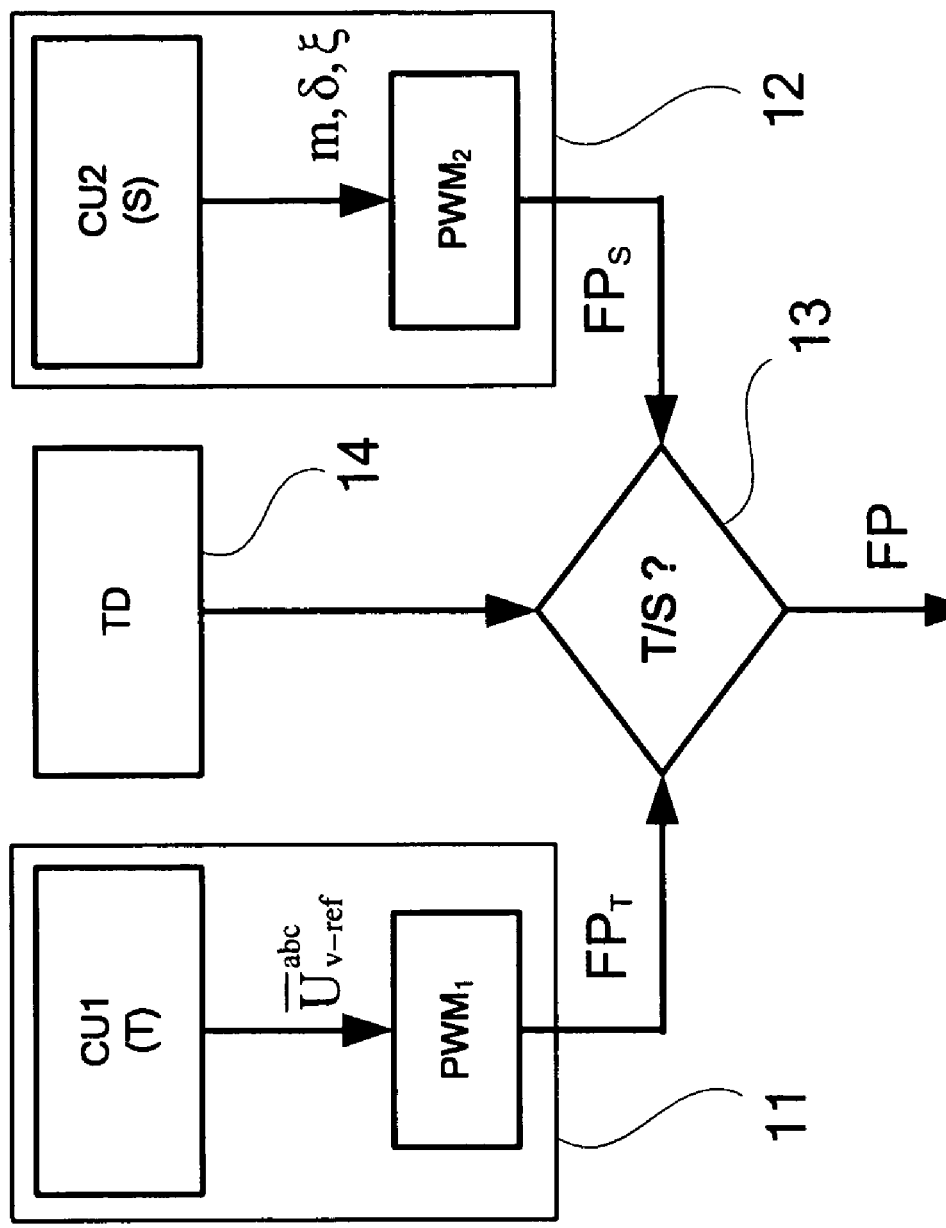
FIG. 3 shows as an overview of an embodiment of converter control equipment according to the invention.

FIG. 3 shows as a principal layout of a converter control equipment according to the invention. The converter control comprises a first control 11, a mode control 14, a second control 12 and a selector 13. The mode control comprises in the embodiment shown a transient control TD. The first control 11 comprises a first control unit $CU_1$ and a first pulse-width modulator $PWM_1$ for providing a control signal $FP_T$. The second control 12 comprises a second control unit $CU_2$ and a second pulse-width modulator $PWM_2$ for providing a control signal $FP_S$. The second pulse-width modulator $PWM_2$, which operates with a low switching frequency, is in the figure connected to one side of a selector 13. The first pulse-width modulator $PWM_1$, which operates with a high switching frequency, is connected to another side of the selector 13. Depending on the output from mode detector 14 the selector will decide the actual executed switching pulse FP. The first and second pulse-width modulator may comprises preferably a carrier based PWM such as sinusoidal PWM (SPWM), or sinusoidal PWM including 3rd harmonic modulation (3PWM) or an optimal PWM such as OPWM. Preferable, however, is that the first PWM has a faster operating speed than the second PWM.

Figure 4A:
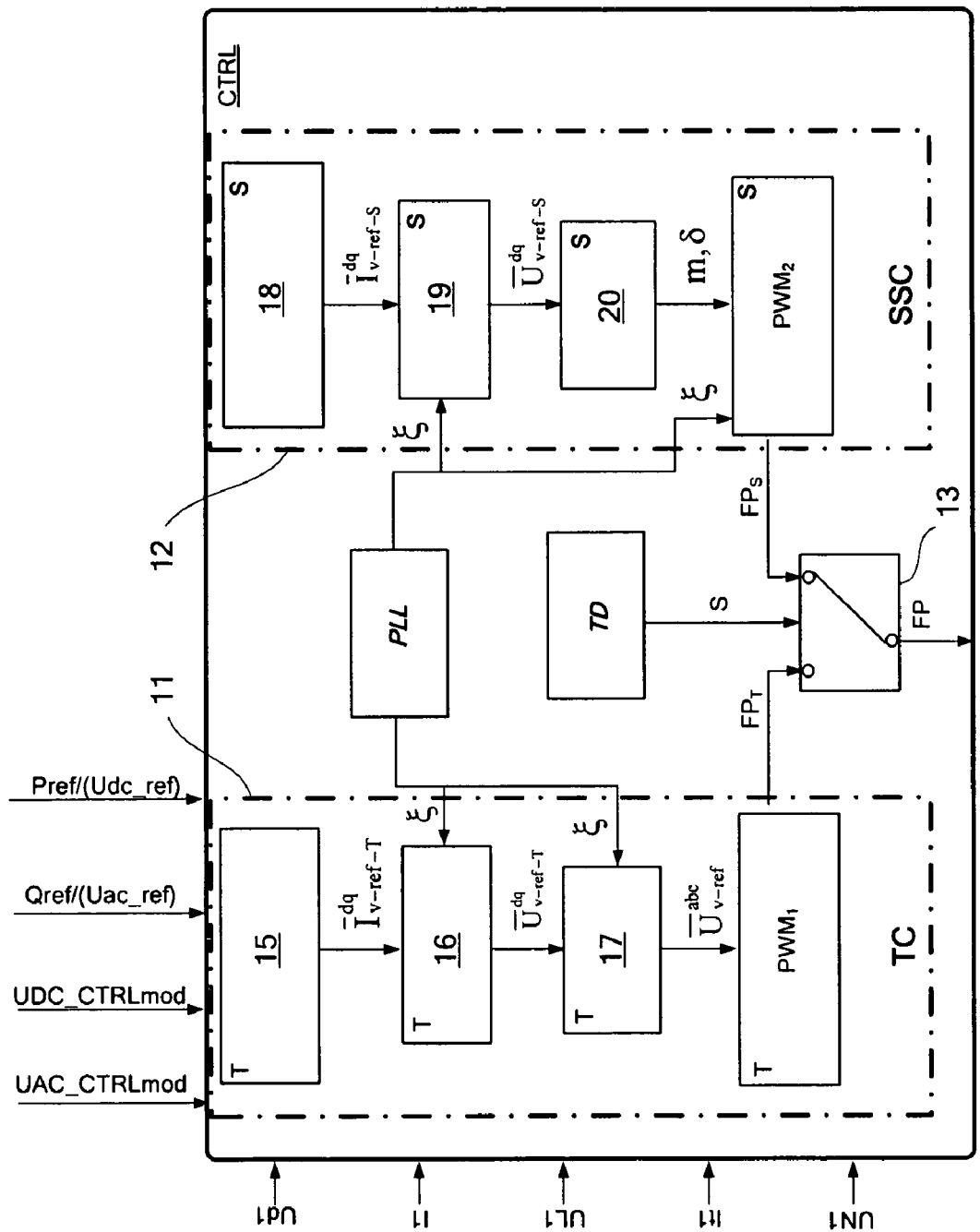
FIG. 4A shows an embodiment of converter control equipment and method according to the invention.

FIG. 4A shows an embodiment of converter control equipment CTRL according to the invention. In this embodiment the first control 11 comprises a transient control TC containing an outer control 15 containing an outer active/reactive power control loop, an inner control 16 containing an inner current control loop, a reference transformation unit 17 and a carrier based pulse-width modulator 3PWM. The second control 12 comprises a steady state control SSC containing in this embodiment an outer control 18 containing an outer active/reactive power control loop, an inner control 19 containing an inner current control loop, a reference transformation unit 20 and an optimal pulse-width modulator OPWM. Common for both the transient control and the steady state control the control equipment comprises a phase-locked loop unit PLL for providing a control signal ξ to the inner controller 16, 19 and the reference transformer 17, 20 for both the transient controller 14 and the steady-state controller SSC.

The controller according to the invention comprises two outer active/reactive power control loops, two inner current control loops, two reference transformation blocks and two pulse-width modulators. The corresponding control loops or functional blocks operate in parallel and have the same original inputs (measured signals and references), but the structure or control parameters for the corresponding control loop is different, thereby the outputs is different in either values or signals. In the process of steady-state control, the parameters for regulators and measured signal processing in the outer and inner control loops are optimized for achieve best steady-state harmonic performance and stability. In the process of transient control, the parameters for regulators and measured signal processing in the outer and inner control loops are optimized for achieving fast response speed. The transient detection will make the pulses generated from the transient control the actual executed switching pulse when a transient is detected, otherwise the actual executed switching pulse is generated from the steady-state control.

Figure 4B:
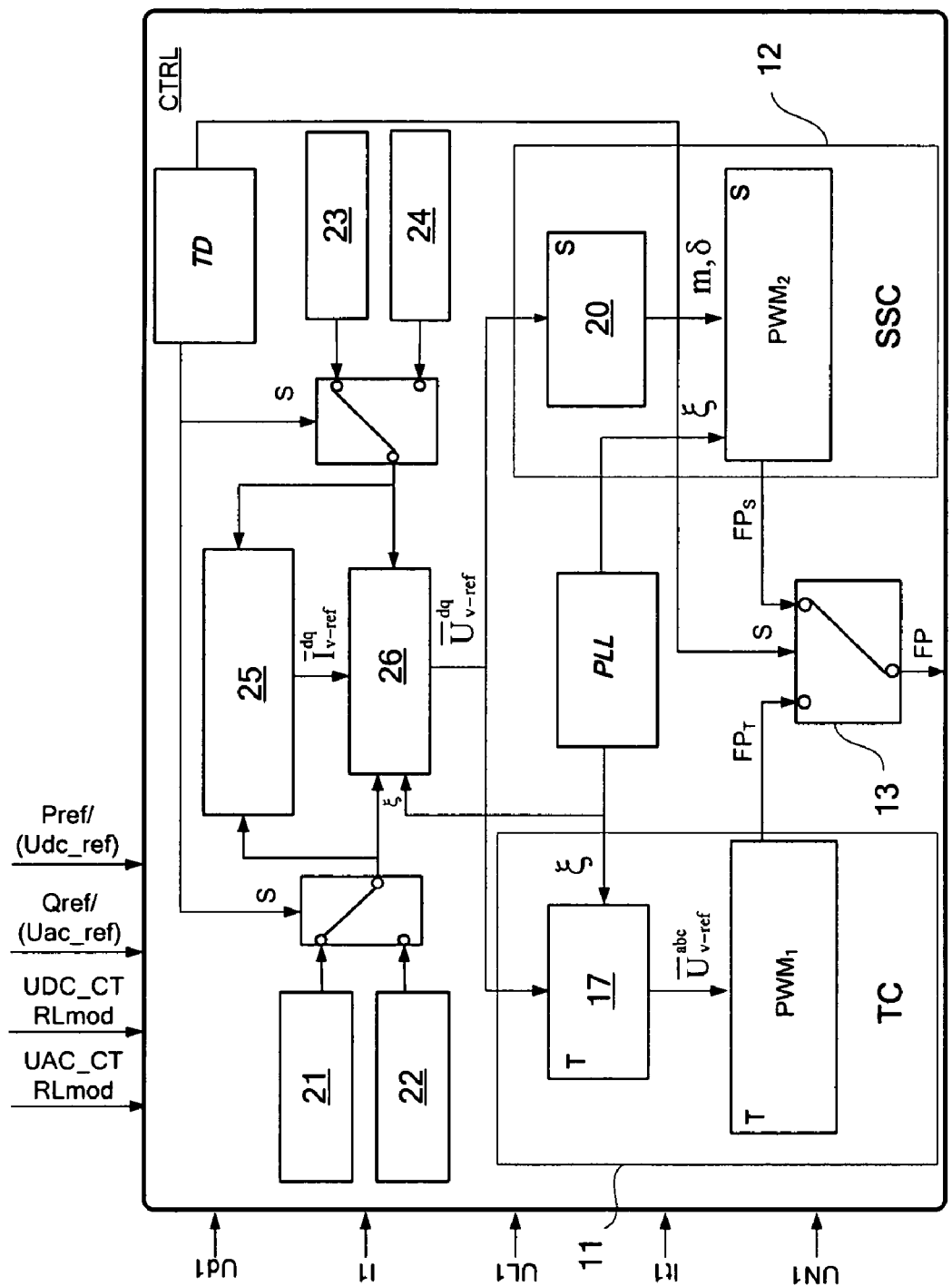
FIG. 4B shows another embodiment of converter control equipment and method according to the invention.

FIG. 4B shows another embodiment of converter control equipment and method according to the invention. In this embodiment, both the transient and steady-state control 11 and 12 respectively share the same outer control 25 containing an outer active/reactive power control loop and inner control 26 containing an inner current control loop. Thus a measured signal processing (filtering) for transient control 21 and a measured signal processing (filtering) for steady state control 22 is controlled by the transient detection unit 14. Simultaneously the parameters for transient control 23 and the parameters for the steady state control 24 is also controlled by the transient detection unit 14. However, the parameters for the controllers as well as the processing for the sensed signals are changed depending of the output of transient detection 14. The transient control 11 in this embodiment comprises the reference transformation unit 17 and the carrier based pulse with modulator 3PWM. The steady-state control SSC in the embodiment comprises the reference transformation unit 20 and the optimal pulse with modulator OPWM. For instance, in order to achieve a faster response speed the gain for a regulator belongs to transient control is set to a higher value.

The advantage of implementation strategy according to the embodiment in FIG. 4B is that it avoids building double controllers for the same control loop.

Figure 4C:
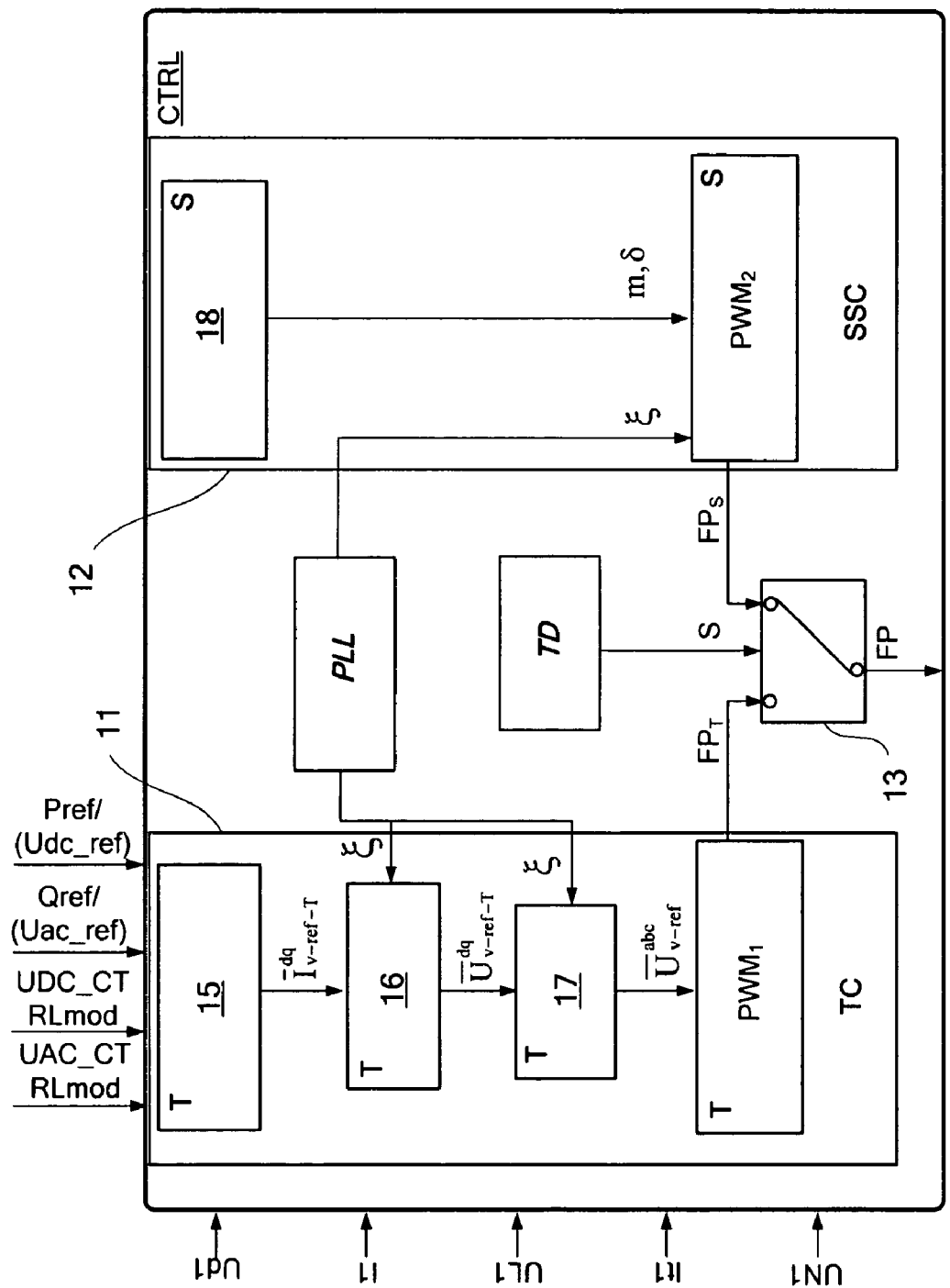
FIG. 4C shows another embodiment of converter control equipment and method according to the invention.

FIG. 4C shows another embodiment of converter control equipment and method according to the invention. In this embodiment the transient control 11 will take over whenever the current is out of control. Thus the steady-state control is simplified by controlling the active power (or DC voltage) via the phase angle (δ) and by controlling the reactive power (or AC voltage) via the modulation index (m) directly.

The way of controlling the active power (or DC voltage) via the phase angle (δ) is shown in FIG. 4C-A. An active power signal Po is calculated by an active power calculation unit 30 and a filtered power signal P is provided by a signal processing unit 31. The power signal is compared with a reference signal and a phase angle (δ) is provided by a regulator 32. The way of controlling the reactive power (or AC voltage) via the modulation index (m) is shown in FIG. 4C-B. A reactive power signal Qo is calculated by an reactive power calculation unit 33 and a filtered reactive power signal Q is provided by a signal processing unit 34. The reactive power signal is compared with a reference signal and a modulation index (m) is provided by a regulator 35.

Figure 5:
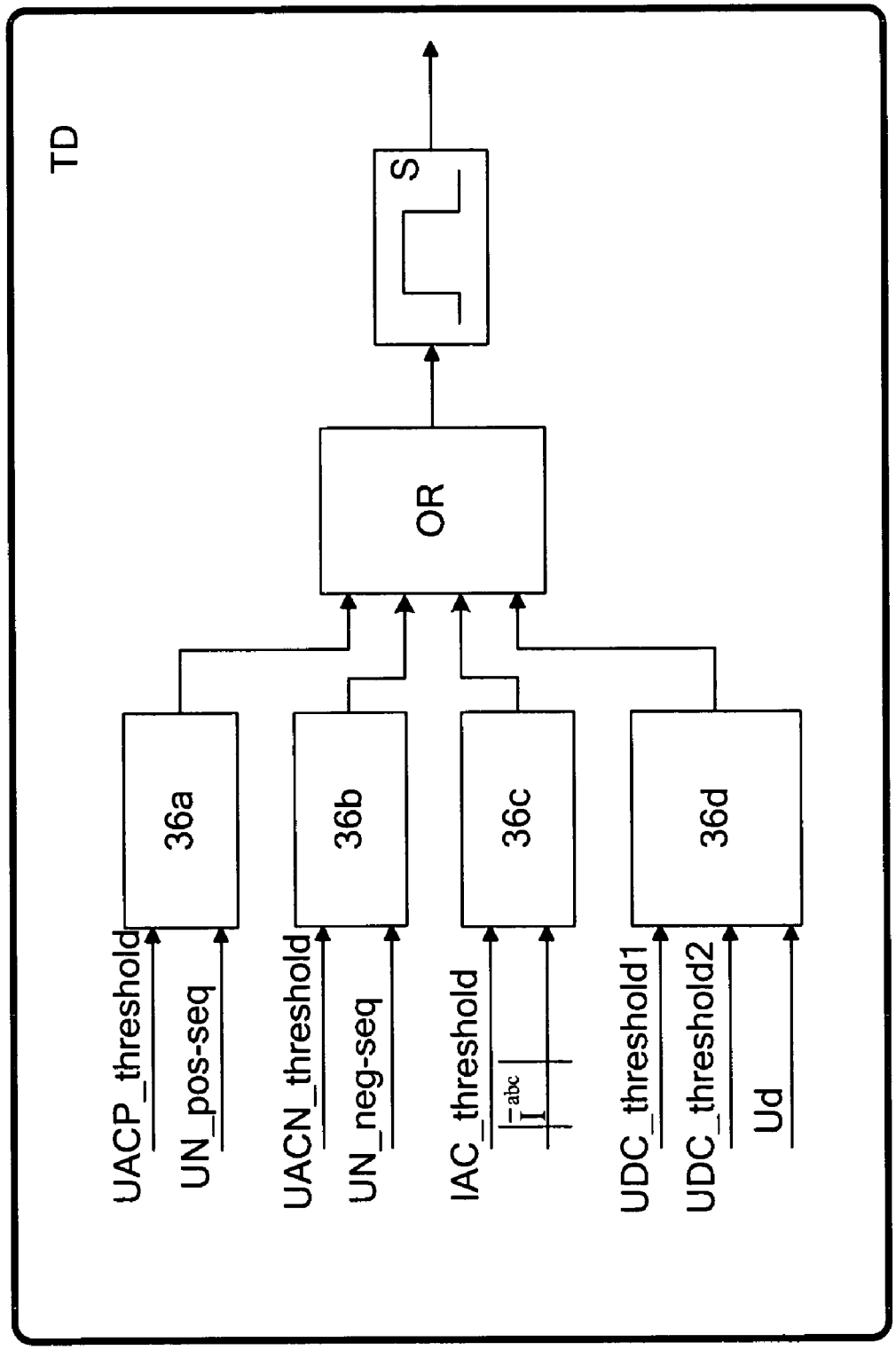
FIG. 5 shows an embodiment of the functional block "transient detection" in converter control equipment and method according to the invention.

FIG. 5 illustrates as an example the structure of the functional block for transient detection. The principal idea is to use all measured signals, or part of all measured signals, to identify as soon as possible if there is a disturbance occurring in the connected AC networks or DC transmission systems. The structure block comprises four comparators 36 a-d indicating to an OR function the presence of a transient. In normal operation condition when there is no disturbance, the three AC voltage is normally symmetrical, i.e., the negative sequence component (UN_neg_seq) is close to zero, and the amplitude of positive sequence component (UN_pos_seq)stays within −10%~+10% of the nominal AC voltage, the DC voltage is controlled to the reference voltage, the AC current is controlled to within the rated current. Therefore, if one of the following conditions is not fulfilled, it can be considered that there is a disturbance occurring.

$$\begin{cases} UN\_pos-seq > UACP\_threshold \\ UN\_neg-seq < UACN\_threshold \\ \{|i_a|,|i_b|,|i_c|\} < IAC\_threshold \\ UDC\_threshold1 < Ud < UDC\_threshold2 \end{cases}$$

The indication of a disturbance occurring will generate a pulse that will make switching order generated by the transient control actually executed by valves. The width of the pulse may be decided in advance in according to the time needed for clearing an AC fault, say for instance 100 ms or 500 ms to be conservative. By now it is clear that most of the time the converter is switching with lower switching frequency by using OPWM while presents a desired harmonic and stability performance. Due to the fast response speed of transient control, the over DC voltage and over AC current is under well control when a disturbance occurs and quick recover is realized after the disturbance. As a result, the improved transient and steady-state performance as well as the reduction of cost are achieved by this optimized modulation and control system according to the invention.

Although favorable the scope of the invention must not be limited by the embodiments presented but contain also embodiments obvious to a person skilled in the art.

The invention claimed is:

1. A voltage source converter for high power application, comprising:
    a plurality of valves, each valve comprising a plurality of extinguishable semiconducting elements, and
    a valve control unit configured to control the voltage source converter via an executing pulse-width modulation signal,
    wherein the valve control unit comprises a first control unit, a first pulse-width modulator for providing a first pulse-width modulation signal according to a fast dynamic control, a second control unit, a second pulse-width modulator for providing a second pulse-width modulation signal according to a slow dynamic control, a mode detector configured to detect a first mode of operation of the voltage source converter and a second mode of operation of the voltage source converter, and a selector connected to the first pulse-width modulator and second pulse-width modulator for selecting in dependence of the mode detector, the second pulse width modulation signal during the first mode of operation and the first pulse width modulation signal during a second mode of operation as the executing pulse-width modulation signal.

2. The voltage source converter according to claim 1, wherein the first pulse-width modulator comprises a carrier based pulse-width modulator.

3. The voltage source converter according to claim 1, wherein the second pulse-width modulator comprises an optimum pulse-width modulator.

4. The voltage source converter according to claim 1, wherein the second pulse-width modulator comprises a carrier based pulse-width modulator with a switching frequency different from the first pulse-width modulator.

5. The voltage source converter according to claim 1, wherein the first control unit comprises a transient control.

6. The voltage source converter according to claim 1, wherein the second control unit comprises a steady-state control.

7. The voltage source converter according to claim 1, wherein the valve control unit comprises a phase-locked loop unit common to the first control unit and the second control unit.

8. The voltage source converter according to claim 1, wherein the valve control comprises an outer control and an inner control common to the first control unit and the second control unit.

9. The voltage source converter according to claim 1, wherein the first control unit comprises a reference transformer.

10. The voltage source converter according to claim 9, wherein the first control unit further comprises an outer controller and an inner control.

11. The voltage source converter according to claim 1, wherein the second control unit comprises a reference transformer.

12. The voltage source converter according to claim 11, wherein the second control further comprises an outer control.

13. A method for controlling a voltage source converter comprising a plurality of valves, each valve comprising a plurality of extinguishable semiconducting elements in a high power application, the method comprising:
    providing an executing pulse width modulation signal for controlling the voltage source converter,
    detecting a first mode of operation and a second mode of operation of the voltage source converter,
    controlling the voltage source converter during the first mode of operation and a first period of time wherein the executing signal comprises a second pulse-width modulation signal according to a slow dynamic control, and
    controlling the voltage source converter during the second mode of operation and a second period of time, following the first period of time, wherein the executing signal comprises a second pulse-width modulation signal according to a fast dynamic control.

14. The method according to claim 13, wherein the second period of time comprises a steady state mode and the second pulse-width modulation signal comprises an optimum pulse-width modulation signal.

15. The method according to claim 13, wherein the second period of time comprises a steady state mode and the second pulse-width modulation signal comprises a carrier based pulse-width modulation signal.

16. The method according to claim 13, wherein the first period of time comprises a transient mode and the first pulse-width modulation signal comprises a carrier based pulse-width modulation signal.

17. A computer program product storable on a computer readable medium containing computer program instructions executable by a processor for performing the steps of
   providing an executing first pulse width modulation signal for controlling the voltage source converter,
   detecting a first and a second mode of operation of the converter,
   controlling the voltage source converter during the first mode of operation and a first period of time wherein the executing signal comprises a second pulse-width modulation signal according to a slow dynamic control, and
   controlling the voltage source converter during the first mode of operation and a second period of time, following the first period of time, wherein the executing signal comprises a second pulse-width modulation signal according to a slow dynamic control.

18. The computer program product according to claim 17 provided at least in part over a network, such as the Internet.

19. Use of a voltage source converter according to claim 1 in a HVDC transmission system for controlling the operation.

20. Use of a voltage source converter according to claim 1 in a static var compensation system for controlling the operation.

* * * * *